US007236993B2

United States Patent
Brown et al.

(10) Patent No.: US 7,236,993 B2
(45) Date of Patent: Jun. 26, 2007

(54) ON-DEMAND MULTI-VERSION DENORMALIZED DATA DICTIONARY TO SUPPORT LOG-BASED APPLICATIONS

(75) Inventors: Archie W. Brown, Milford, NH (US); Goutam D. Kulkarni, Nashua, NH (US); Joydip Kundu, Derry, NH (US); Douglas Voss, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 396 days.

(21) Appl. No.: 10/414,027

(22) Filed: Apr. 16, 2003

(65) Prior Publication Data

US 2004/0210606 A1    Oct. 21, 2004

(51) Int. Cl.
*G06F 12/00* (2006.01)
*G06F 17/30* (2006.01)
*G06F 17/00* (2006.01)

(52) U.S. Cl. .................................................. 707/203
(58) Field of Classification Search ................ 707/203, 707/204, 1, 100
See application file for complete search history.

(56) References Cited

U.S. PATENT DOCUMENTS 6,618,822 B1 * 9/2003 Loaiza et al. ................. 714/20
2002/0103819 A1 * 8/2002 Duvillier et al. ............ 707/206

OTHER PUBLICATIONS

Technical Work Paper Oracle9i LogMiner Jan. 2002 22 pages.*
Oracle 9I Database Administrator;s Guide Release 1 (9.0.1) Jun. 2001 pp. 9-1 to 9-22.*

* cited by examiner

Primary Examiner—Sam Rimell
Assistant Examiner—Cory Bell
(74) Attorney, Agent, or Firm—Bingham McCutchen LLP

(57) ABSTRACT

A method, system, and computer program product provides a data dictionary that can represent multiple versions of the schema objects, and which provides improved performance, reduced computing costs, and more accurate results in a variety of applications, such as in a database redo log mining system. A method of providing a data dictionary comprises the steps of determining whether information about the data object is present in a denormalized data dictionary history table, and if the information about the data object is not present in the denormalized data dictionary history table, then querying a normalized data dictionary to obtain the information about the data object, including a version identifier of the data object, and storing the version identifier and the obtained information about the data object including the version identifier in the denormalized data dictionary history table.

18 Claims, 5 Drawing Sheets

ON-DEMAND MULTI-VERSION DENORMALIZED DATA DICTIONARY TO SUPPORT LOG-BASED APPLICATIONS

FIELD OF THE INVENTION

The present invention relates to a method, system, and computer program product for providing a data dictionary that can represent multiple versions of the schema objects, and which provides improved performance, reduced computing costs, and more accurate results.

BACKGROUND OF THE INVENTION

In a typical relational database management system (RDBMS), all modifications to the database are logged in a redo stream (made up of redo records) to provide recovery and transaction durability. This redo stream (or redo log) can be used to drive asynchronous applications providing a variety of functionality. For example, the redo stream can be used to provide Logical Standby, in which a standby database shadows a primary database by extracting committed transactions out of the redo stream and applying those transactions. As another example, the redo stream can be used to provide Log-based replication, in which a replica site extracts committed changes made to the tables of interest in the database and applies the changes in order to keep the replica tables synchronized. As yet another example, the redo stream can be used to provide user query functionality, in which the redo stream is queried as though it were a relational table.

In one conventional application, the redo stream is analyzed to derive the equivalent data manipulation language (DML) statements that produced the redo stream. DML statements belonging to the same transaction are grouped together and committed transactions are provided to the application. Redo records typically only identify the modified schema objects or the associated columns with numbers generated internally to the database management system (DBMS). In order to perform log analysis and subsequent application of transactions, a data dictionary is needed to provide the mapping from the numbers to user-defined names. For example, SQL statements use column names and table names.

The organization of schema objects is not static. For example, columns may be dropped from or added to a table. Each new organization of a schema object defines a new version of the object. Since asynchronous log based applications may process a given portion of the redo stream multiple times and the organization of a schema object may change in the portion of the redo stream that must be reprocessed, the data dictionary required to do log analysis must represent multiple versions of the schema objects. Conventional log analysis application could only process a given portion of the redo stream one time or would allow multiple passes over a given portion of the redo stream either by requesting that the data dictionary be completely reloaded before each pass (very expensive in terms of computing) or by accepting results that were missing some symbolic information.

A need arises for a technique by which the data dictionary can represent multiple versions of the schema objects that provides improved performance, reduced computing costs, and more accurate results.

SUMMARY OF THE INVENTION

The present invention is a method, system, and computer program product for providing a data dictionary that can represent multiple versions of the schema objects, and which provides improved performance, reduced computing costs, and more accurate results.

In one embodiment of the present invention, a method of providing a data dictionary comprises the steps of determining whether information about the data object is present in a denormalized data dictionary history table, and if the information about the data object is not present in the denormalized data dictionary history table, then querying a normalized data dictionary to obtain the information about the data object, including a version identifier of the data object, and storing the obtained information about the data object including the version identifier in the denormalized data dictionary history table. The denormalized data dictionary history table may comprise at least one flattened table containing denormalized descriptions of data objects that have been previously referenced or reorganized. The method may further comprise the steps of receiving a stream of redo information from a database management system, the redo information comprising information relating to modifications made to a database of the database management system, and detecting a data dictionary transaction in the stream of redo information. The data dictionary transaction may represent a modification made to a system catalog of the database management system. The normalized data dictionary may comprise a normalized replication of the system catalog of the database management system. The information about the data object may comprise a denormalized description of the data object.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
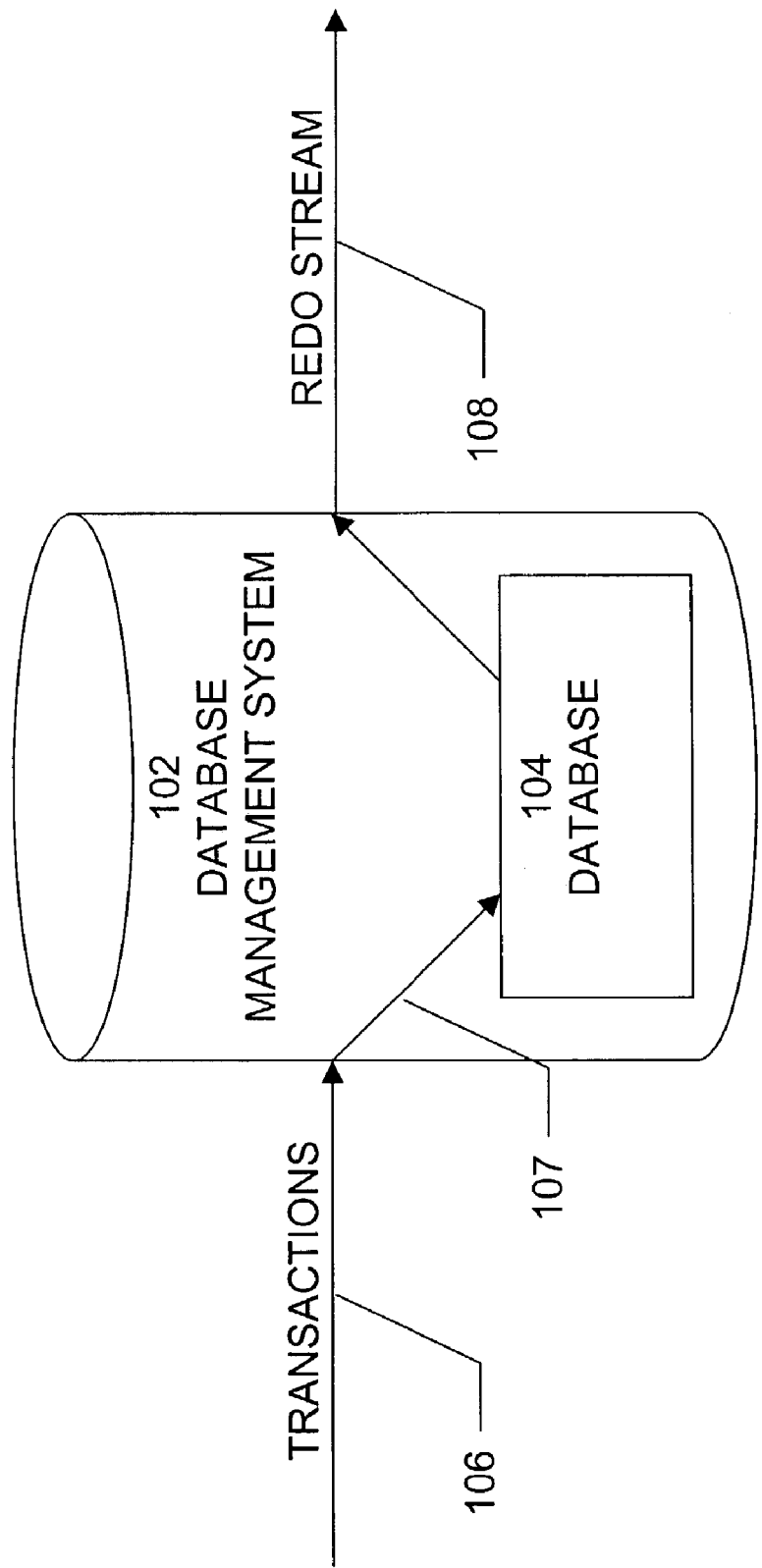
FIG. 1 is an exemplary block diagram of a database management system, in which the present invention may be implemented.

An exemplary database management system (DBMS) 102, in which the present invention may be implemented, is shown in FIG. 1. Database management system (DBMS) 102 provides the capability to store, organize, modify, and extract information from one or more databases included in DBMS 102. From a technical standpoint, DBMSs can differ widely. The terms relational, network, flat, and hierarchical all refer to the way a DBMS organizes information internally. The internal organization can affect how quickly and flexibly information can be extracted.

Each database included in DBMS 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

DBMS 102 may also include one or more database applications, which are software that implements a particular set of functions that utilize one or more databases. Examples of database applications include:
  computerized library systems
  automated teller machines
  flight reservation systems
  computerized parts inventory systems Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

DBMS 102 includes one or more databases, such as database 104. Database 104 includes one or more data tables. One or more streams of transactions, such as transaction stream 106, are input to DBMS 102. A transaction is any database operation that may result in a change to database 104 or to the data stored in database 104. Each transaction includes one or more Data Manipulation Language (DML) statements 107, which are used to store, retrieve, modify, and erase data from database 104. The performance of the DML statements 107 making up each transaction results in changes being made to the data stored in database 104. These changes are used to generate redo stream 108, which may be output from DBMS 102. Redo stream 108 includes a plurality of redo records, in which each redo record specifies one or more changes that were made to the database or to the data stored in the database.

Transaction stream 106 includes a plurality of transactions, which include commands and/or statements that cause the performance of database operations that may result in a change to database 104 or to the data stored in database 104. The commands and/or statements included in transaction stream 106 may be DML statements, or they may be higher-level commands, such as Application Program Interface (API) calls. Where transaction stream 106 includes API calls, these calls typically are converted to DML statements 107, in order for the transactions to be performed. Where transaction stream 106 includes DML statements, in some embodiments, the DML statements may be performed directly, while in other embodiments, the DML statements may be converted to lower-level DML statements, which are then performed. For example, in some embodiments, transaction stream 106 may include DML statements, such as SQL statements, the SQL statements may be performed directly. In other embodiments, transaction stream 106 may include DML statements, such as SQL statements, but the SQL statements are converted to lower-level DML statements, which are then performed.

The redo records included in redo stream 108 may be processed to reconstruct the equivalent DML statement that produced them. DML statements belonging to the same transaction are grouped together and committed transactions are returned to the application. Since redo records identify the database objects affected by the transactions by internally generated numbers, in order to perform log analysis and subsequent application of transactions, a data dictionary is needed to provide the mapping between the internally generated numbers and the corresponding user defined names. For example, Structured Query Language (SQL) statements use column names and table names that typically have meaning to a person, while the internal database schema identifies the corresponding columns and tables with internally generated numbers.

Figure 2:
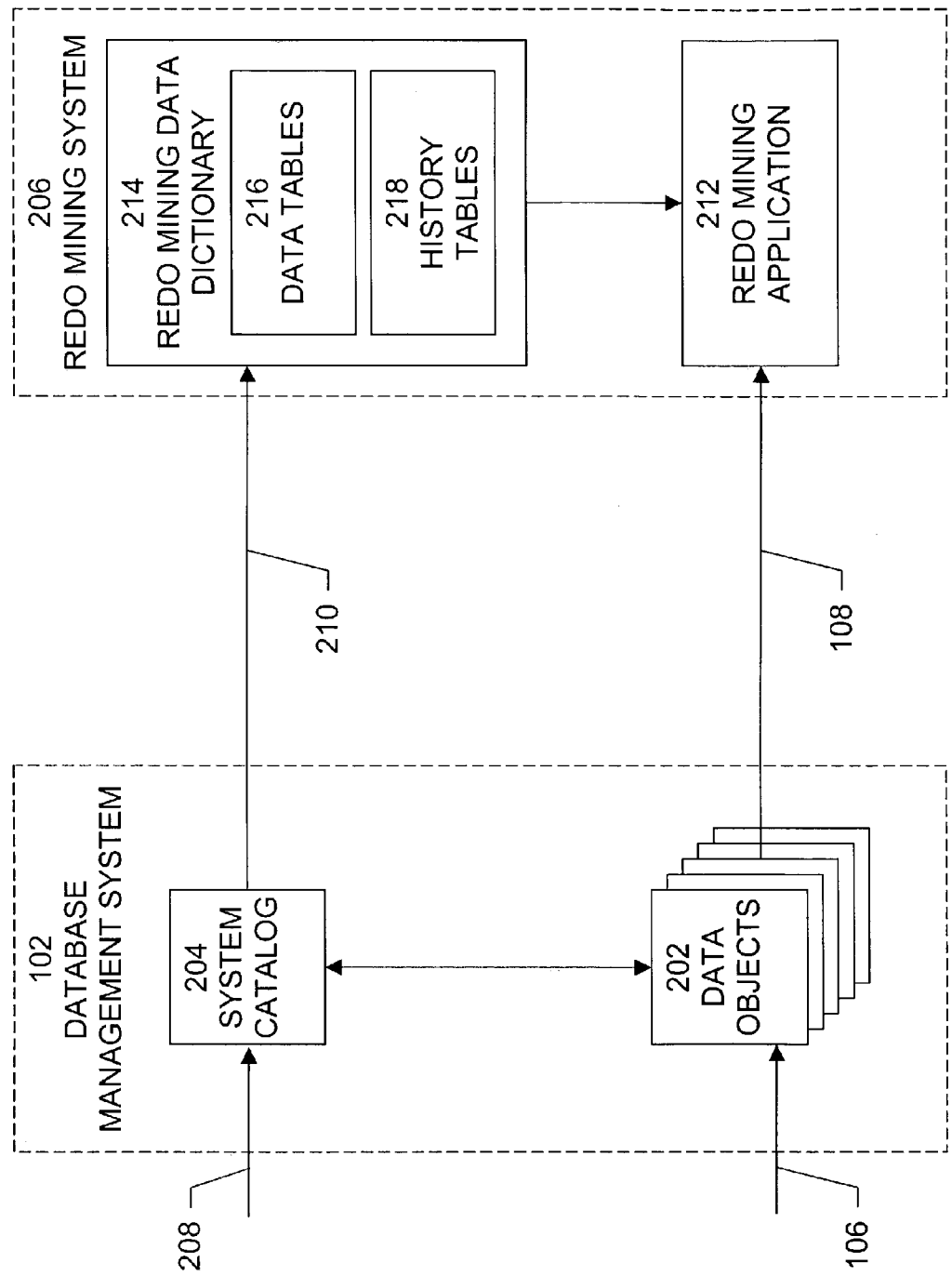
FIG. 2 is an exemplary block diagram of a data flow and a data structure of redo mining, according to the present invention.

An exemplary data flow and data structure of redo mining, according to the present invention, is shown in FIG. 2. Database management system (DBMS) 102 includes a plurality of data objects 202, such as data tables that store data, and system catalog 204, which stores a description of the data objects 202. Data objects 202 are typically stored in an internal format in DBMS 102, and are identified by internally generated identifiers, such as identification numbers. These internally generated identifiers provide efficient access to and processing of the data objects 202 by DBMS 102, but they are not optimal for use by the users of DBMS 102. System catalog 204 includes associations between the internally generated identifiers and object identifiers, such as user-defined names for the objects, which are more useful to the users of DBMS 102.

As shown in FIG. 1, transactions 106 are performed by DBMS 102. Transactions 106 cause changes to be made to the data stored in data objects 202. These changes are captured by redo stream 108 and transmitted to redo mining system 206. In addition, changes 208 are made to the contents of system catalog 204 and these changes are reflected as structural changes in data objects 202. For example, data tables may be created or deleted, within data tables columns may be created or deleted, tables or columns may be renamed, etc. The initial state of system catalog 204 and changes reflected in system catalog 204 are also transmitted to redo mining system 206, preferably as data dictionary language (DDL) transactions. Typically, DDL transactions 210 are transmitted to redo mining system 206 in redo stream 108, but for clarity, they are shown separately in FIG. 2.

Redo mining system 206 includes redo mining application 212 and redo mining data dictionary 214. Redo mining application 212 processes redo stream 108 to provide functionality such as logical standby, log-based replication, query functionality, etc. Data dictionary 214 includes data dictionary data tables 216 and history tables 218. Data tables 216 do not include the historical versions of the state of system catalog 204, but they do include the current state, in normalized format. The normalized format is similar to the format in which the information is stored in system catalog 204. In the normalized format, a set of relational database tables is used to store the information.

History tables 218 include information about at least some of the historical versions of the state of system catalog 204 in a denormalized format. Preferably, only a portion of the historical states are captured, such as those bounded by specified starting and ending times. In the denormalized format, the information for each system catalog that is stored in the tables of the normalized format is stored in at least one flattened data table, which is shown further in FIG. 4. There may be a plurality of history tables 218 as there may be a plurality of system catalogs in DBMS 102.

Each data object referenced in history tables 218 is identified by an object identifier, such as a number, and an object version. This provides the capability to perform mining of redo stream 108 as data objects 202 change. For example, if a column is added to a data table and redo mining application 212 is processing the redo stream for that data table, the processing of the versions of the data table that existed before the addition of the column will be different than the processing of the versions of the data table that existed after the addition of the column.

Version numbers are assigned by the DBMS 102 and written to a system catalog 204 table at the time a relevant object is created or modified. When the initial mining dictionary 214 is created, the version numbers along with other object attributes are communicated from the system catalog 204 to the mining data dictionary data tables 216. If a DDL event occurs on DBMS 102 that alters an object, such as the addition of a column to a table, the table object's version number is incremented in the system catalog 204, redo that shows that the version has been updated is transmitted via redo stream 210 and is applied to the mining dictionary data tables 216.

Typically, only a small percentage of the total number of data objects 202 in a database is required to mine a given set of redo log files. Two different circumstances will cause required mining data from the data tables 216 to be written to a history table 218. One is the request by a redo mining application for object information while processing a data manipulation language (DML) transaction. The other is the manipulation of the dictionary by the redo mining system 206 while processing a data dictionary language (DDL) transaction.

Figure 3:
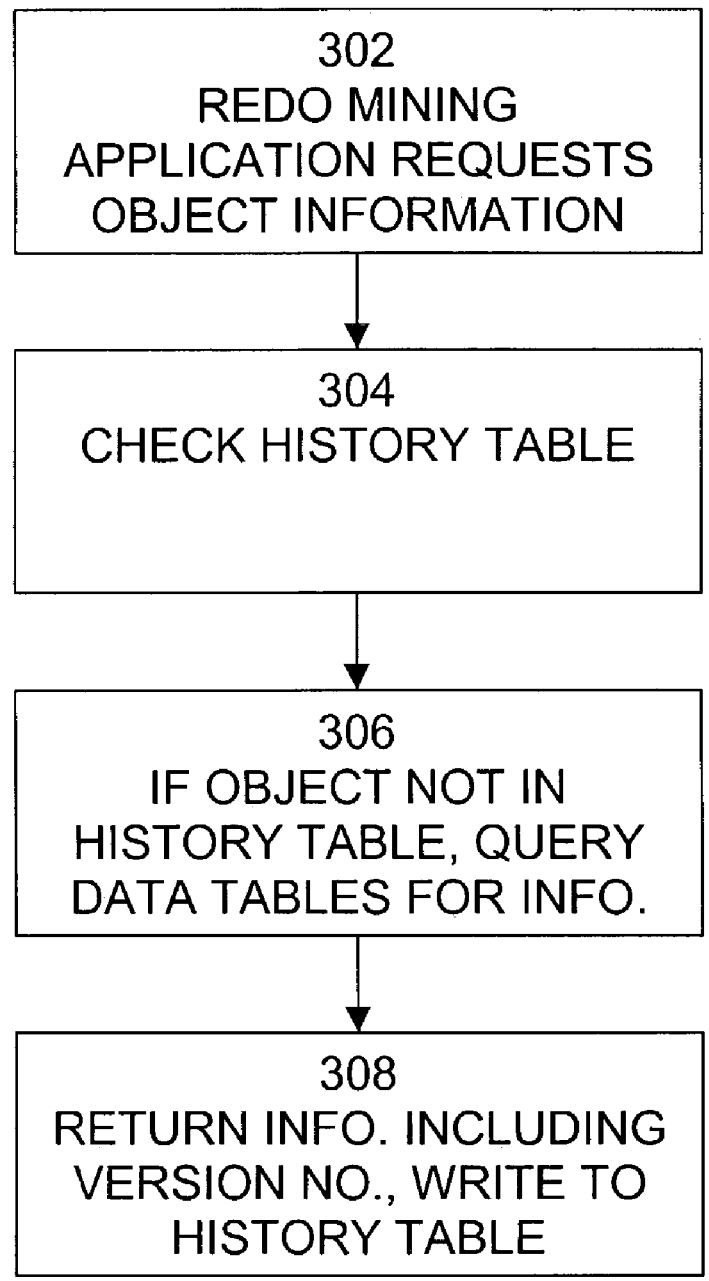
FIG. 3 is an exemplary flow diagram of a process of redo mining using a multi-version redo mining data dictionary shown in FIG. 2.

FIG. 3 shows an exemplary flow diagram of a process 300 of redo mining using multi-version redo mining data dictionary 214. It is best viewed in conjunction with FIG. 2. The process begins with step 302, in which a DML transaction is detected by the redo mining application while processing the redo stream. The redo mining application requests a description of an object that was manipulated by the DML transaction. This request for information includes the object number and the object version, which are the keys to access data dictionary 214.

In step 304, the request for information from the data dictionary 214 is first checked in a data dictionary history table 218. The redo mining data dictionary 214 queries the appropriate data dictionary history table 218 to establish whether the current version of the requested object is present. A history table 218 stores denormalized descriptions of data objects that have been previously referenced by a DML event or reorganized by a DDL event. If the requested data object is found in a history table 218, step 308 will be next. If the requested data object is not found in a history table 218, this means that the object has never been modified and never been previously referenced by redo mining system 206, and step 306 will be next.

In step 306, data tables 216 are queried to obtain the information about the requested data object. Data tables 216 are a normalized replication of system catalog 204 of DBMS 102, which produced the redo stream being processed. Redo mining data dictionary system 214 queries the normalized data tables 216 and obtains a denormalized description of the requested data object. The complexity and cost to query data tables 216 is typically more than to query a history table 218.

In step 308, the information about the requested object is returned. A version identifier, such as a version number, is included in the returned result. The denormalized description of the data object, including the version identifier, is, if not already present there, saved to the appropriate data dictionary history table 218.

A DDL event in redo stream 108 may also cause data to be written to a history table 218. A DDL transaction typically includes a special DDL event marker followed by redo information associated with the various manipulations of the relevant system catalog tables. A DDL transaction is inserted into the redo stream 108 when a modification is made to system catalog 204.

Certain DDL events, which are going to cause the contents of the data tables 216 to be altered, will first trigger the fetching of relevant object descriptions from data tables 216 and the writing of that information to a history table 218. This will happen when the version number of an object changes or when an object is deleted. For example, a DDL event that adds a new column to a partitioned table is an event that changes the version number for that table object. Before data tables 216 are modified to reflect the addition of a new column to the table object, a description of the table object and of each of the table's partition objects is captured and written to history table 218. Then the redo information, which resulted from the original manipulations of the system catalog 204, is transformed and applied to manipulate the corresponding tables of the normalized data tables 216. The result is that a description of the previous version of the data object is captured in a history table 218 and the current version of the data object is captured in the normalized data tables 216.

Figure 4:
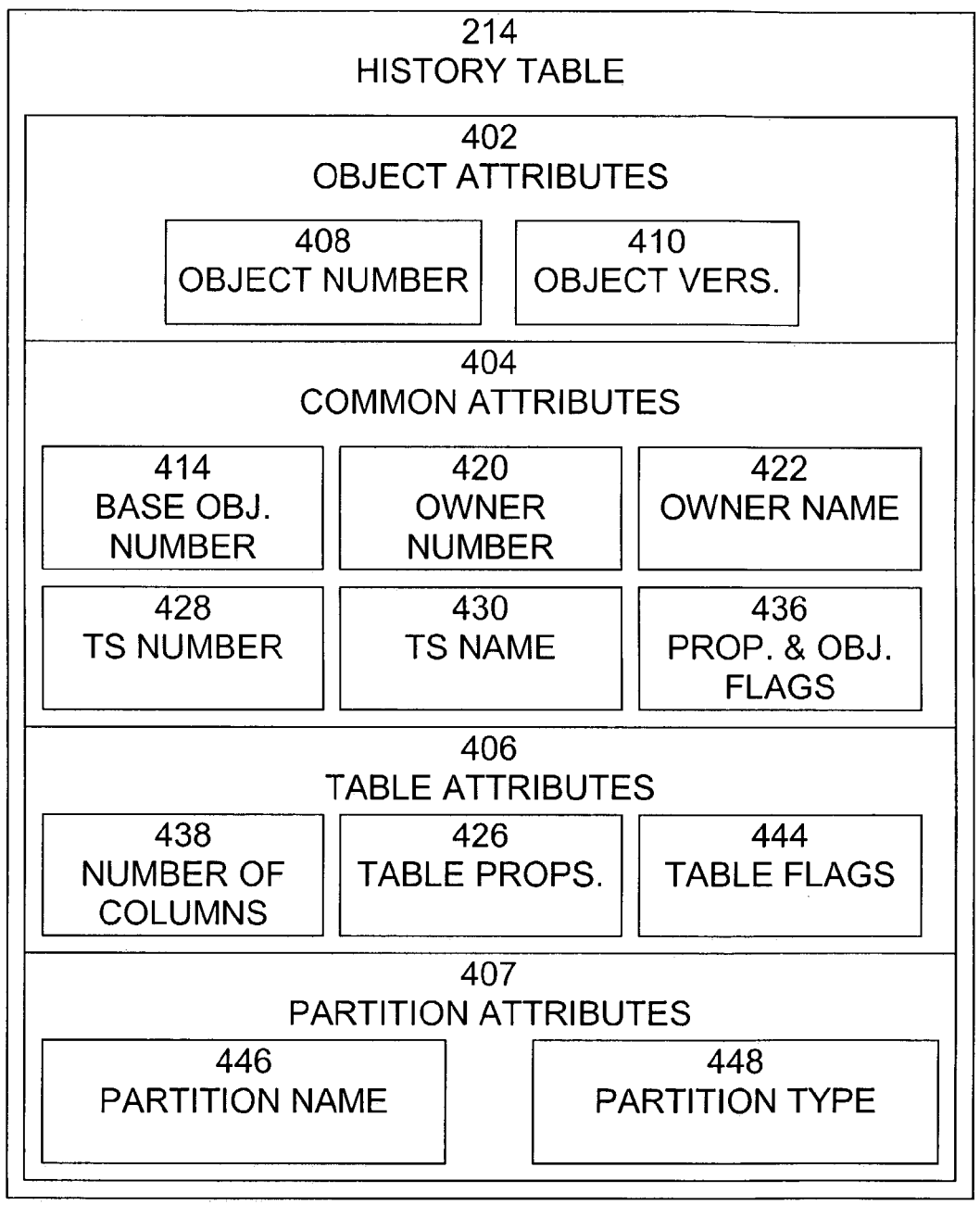
FIG. 4 is an exemplary format of a denormalized history table, shown in FIG. 2.

An example of a denormalized history table, such as history table 218, shown in FIG. 2, is shown in FIG. 4. History table 218 includes several levels of information, such as object attributes 402, common attributes 404, table attributes 406, and partition attributes 407. Object attributes 402 include key information needed to look up a particular object, such as the object number 408, which identifies the object, and the object version, which identifies the version of the object. Common attributes 404 include attributes that are common for most types of objects. Example attributes include: base object number 414, which identifies the object for simple objects or identifies the parent for dependent objects, owner number 420, which identifies the owner of an object, owner name 422, which is an alphanumeric name of the owner identified by owner number 420, table space number 428, which identifies the table space in which the object is stored in the database, table space name 430, which is an alphanumeric name of the table space identified by table space number 428, and property and object flags 436, which include specific flags defining parameters of the object. Table attributes include number of columns 438, which indicates the number of columns in the table, table properties 426, which defines properties of the table, and table flags 444, which include specific flags defining parameters of the table and the table properties. Some objects described in a history table 218 are table partition objects. Partition Attributes are attributes unique to partition objects. These include: partition name 446, which is the alphanumeric name of the partition with object number 408 and partition type 448, which indicates whether a partition is a simple partition or a subpartition.

Figure 5:
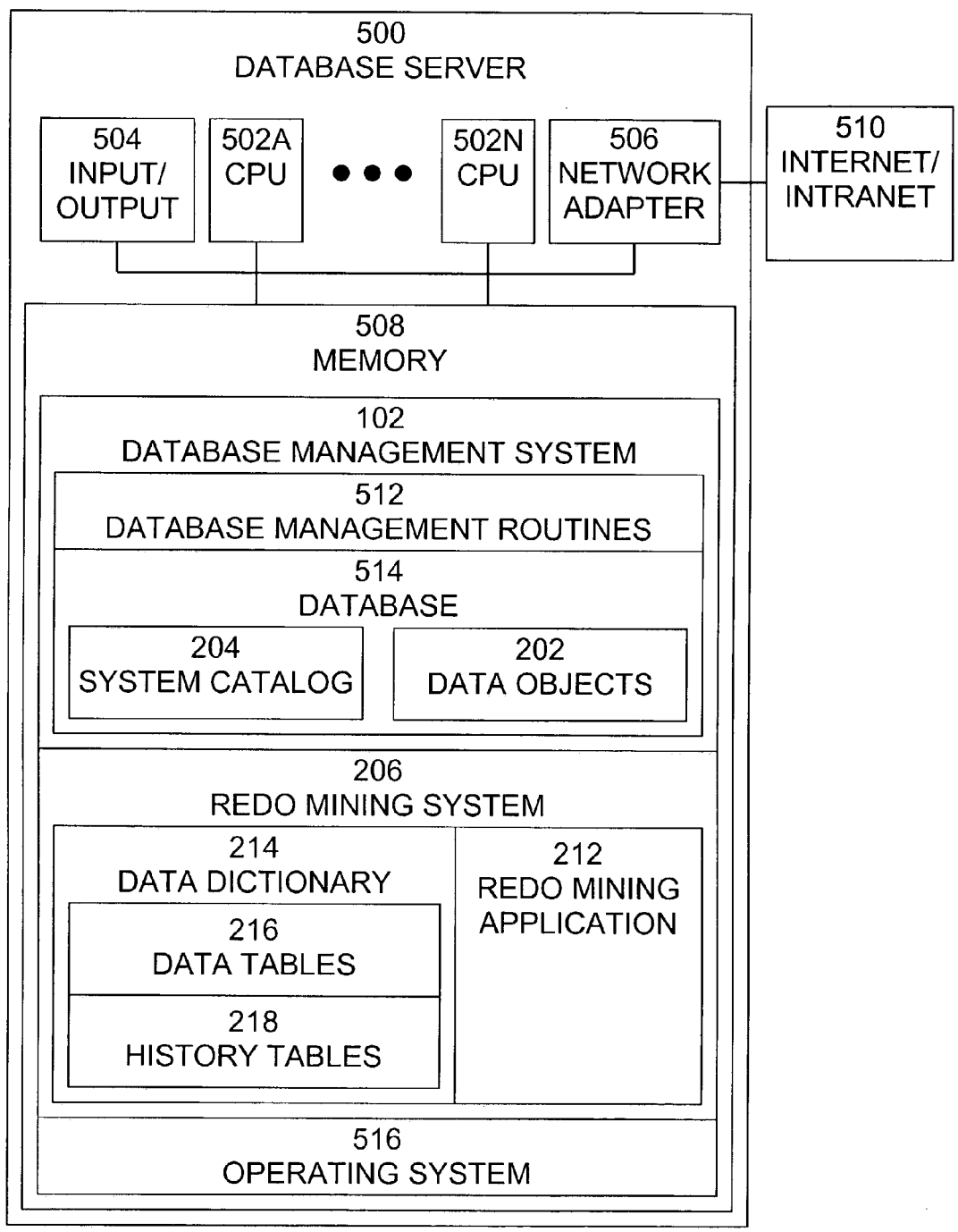
FIG. 5 is an exemplary block diagram of a database server system, in which the present invention may be implemented.

An exemplary block diagram of a database server system 500 is shown in FIG. 5. Server 500 is typically a programmed general-purpose computer system, such as a personal computer, workstation, server system, and minicomputer or mainframe computer. Server 500 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which server 500 is implemented as a single multi-processor computer system, in which multiple processors 502A-502N share system resources, such as memory 508, input/output circuitry 504, and network adapter 506. However, the present invention also contemplates embodiments in which server 500 is implemented as a plurality of networked computer systems, which may be single-processor computer systems, multi-processor computer systems, or a mix thereof.

Input/output circuitry 504 provides the capability to input data to, or output data from, server 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces server 500 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of server 500. Memory 508 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 5, memory 508 includes database management system 102, redo mining system 206, and operating system 516. Although in this example, database management system 102 and redo mining system 206 are both shown included in database server 500, one of skill in the art would recognize that these systems may be implemented together or separately, based on factors such as cost and performance. It is to be noted that the present invention contemplates any and all such implementations.

Database management system (DBMS) 102 provides the capability to store, organize, modify, and extract information from one or more databases included in DBMS 102. Database management system (DBMS) 102 includes a plurality of data objects 202, such as data tables that store data, and system catalog 204, which stores a description of the data objects 202. Data objects 202 are typically stored in an internal format in DBMS 102, and are identified by internally generated identifiers, such as identification numbers. These internally generated identifiers provide efficient access to and processing of the data objects 202 by DBMS 102, but they are not optimal for use by the users of DBMS 102. System catalog 204 includes associations between the internally generated identifiers and object identifiers, such as user-defined names for the objects, which are more useful to the users of DBMS 102.

Redo mining system 206 includes redo mining application 212 and redo mining data dictionary 214. Redo mining application 212 processes redo stream 108 to provide functionality such as logical standby, log-based replication, query functionality, etc. Data dictionary 214 includes data dictionary data tables 216 and history tables 218. Data tables 216 include the current state of system catalog 204, in normalized format. The normalized format is similar to the format in which the information is stored in system catalog 204. In the normalized format, a set of relational database tables is used to store the information.

History tables 218 include information about each historical version of the state of system catalog 204 in a denormalized format. In the denormalized format, the information for each system catalog that is stored in the tables of the normalized format is stored in a single flattened data table, which is shown further in FIG. 4. There may be a plurality of history tables 218 as there may be a plurality of system catalogs in DBMS 102.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of providing a data dictionary comprising the steps of:
   determining whether information about a data object is present in a denormalized history table storing historical information about objects in the data dictionary; and
   upon determining that the information about the data object is not present in the denormalized history table:
   querying a normalized data dictionary table to obtain the information about the data object, including a version identifier of the data object,
   storing, the obtained information about the data object including the version identifier in the denormalized history table, and
   performing a redo log analysis using the data dictionary; and
   providing the result of the analysis to a user.

2. The method of claim 1, wherein the denormalized history table comprises at least one table containing denormalized descriptions of data objects that have been previously referenced or reorganized.

3. The method of claim 2, further comprising the steps of:
   receiving a stream of redo information from a database management system, the redo information comprising information relating to modifications made to a database of the database management system, and
   detecting a data dictionary transaction in the stream of redo information.

4. The method of claim 3, wherein the data dictionary transaction represents a modification made to a system catalog of the database management system.

5. The method of claim 4, wherein the normalized data dictionary comprises a normalized replication of the system catalog of the database management system.

6. The method of claim 5, wherein the information about the data object comprises a denormalized description of the data object.

7. A system for providing a data dictionary comprising:
   a processor operable to execute computer program instructions;
   a memory operable to store computer program instructions executable by the processor; and
   computer program instructions stored in the memory and executable to perform the steps of:
   determining whether information about a data object is present in a denormalized history table storing historical information about objects in the data dictionary; and
   upon determining that the information about the data object is not present in the denormalized history table:
   querying a normalized data dictionary table to obtain the information about the data object, including a version identifier of the data object, and
   storing the obtained information about the data object including the version identifier in the denormalized history table.

8. The system of claim 7, wherein the denormalized history table comprises at least one table containing denormalized descriptions of data objects that have been previously referenced or reorganized.

9. The system of claim 8, further comprising the steps of:
   receiving a stream of redo information from a database management system, the redo information comprising information relating to modifications made to a database of the database management system, and
   detecting a data dictionary transaction in the stream of redo information.

10. The system of claim 9, wherein the data dictionary transaction represents a modification made to a system catalog of the database management system.

11. The system of claim 10, wherein the normalized data dictionary comprises a normalized replication of the system catalog of the database management system.

12. The system of claim 11, wherein the information about the data object comprises a denormalized description of the data object.

13. A computer program product for providing a data dictionary comprising:
   a computer readable recordable-type medium;
   computer program instructions, recorded on the computer readable medium, executable by a processor, for performing the steps of:
   determining whether information about a data object is present in a denormalized history table storing historical information about objects in the data dictionary; and
   upon determining that the information about the data object is not present in the denormalized history table:
   querying a normalized data dictionary table to obtain the information about the data object, including a version identifier of the data object,
   storing, the obtained information about the data object including the version identifier in the denormalized history table.

14. The computer program product of claim 13, wherein the denormalized history table comprises at least one table containing denormalized descriptions of data objects that have been previously referenced or reorganized.

15. The computer program product of claim 14, further comprising the steps of:
receiving a stream of redo information from a database management system, the redo information comprising information relating to modifications made to a database of the database management system, and
detecting a data dictionary transaction in the stream of redo information.

16. The computer program product of claim 15, wherein the data dictionary transaction represents a modification made to a system catalog of the database management system.

17. The computer program product of claim 16, wherein the normalized data dictionary comprises a normalized replication of the system catalog of the database management system.

18. The computer program product of claim 17, wherein the information about the data object comprises a denormalized description of the data object.

* * * * *